(12) United States Patent
Kim et al.

(10) Patent No.: US 8,025,999 B2
(45) Date of Patent: Sep. 27, 2011

(54) POUCH TYPE LITHIUM RECHARGEABLE BATTERY

(75) Inventors: Joongheon Kim, Yongin-si (KR); Hyungbok Lee, Yongin-si (KR)

(73) Assignee: Samsung SDI Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1278 days.

(21) Appl. No.: 11/646,474

(22) Filed: Dec. 28, 2006

(65) Prior Publication Data
US 2007/0154803 A1 Jul. 5, 2007

(30) Foreign Application Priority Data
Dec. 29, 2005 (KR) .................... 10-2005-0134548

(51) Int. Cl.
*H01M 2/08* (2006.01)
(52) U.S. Cl. .................. 429/185; 429/162; 429/163
(58) Field of Classification Search .............. 429/82
See application file for complete search history.

(56) References Cited

U.S. PATENT DOCUMENTS

| 5,273,837 | A | 12/1993 | Aitken et al. |
| 6,371,996 | B1 | 4/2002 | Takayama et al. |
| 2002/0106555 | A1 | 8/2002 | Langan et al. |
| 2004/0183055 | A1 | 9/2004 | Chartier et al. |

FOREIGN PATENT DOCUMENTS

| DE | 4307967 A1 | 9/1994 |
| JP | 2005-093261 | 4/2005 |
| KR | 1020030039703 | * 5/2003 |
| WO | 03034515 A2 | 4/2003 |

OTHER PUBLICATIONS

European Search Report issued on Feb. 10, 2009 in the corresponding European Patent Application No. 06127353.8.

* cited by examiner

*Primary Examiner* — Ula C Ruddock
*Assistant Examiner* — Patricia Davis
(74) *Attorney, Agent, or Firm* — Robert E. Bushnell

(57) ABSTRACT

A pouch type lithium secondary battery includes an electrode assembly includes a positive electrode plate and a negative electrode plate, wherein disposed facing against each other, and a separator interposed between the positive electrode plate and the negative electrode plate, and a case includes a lower plate wherein a second chamber containing the electrode assembly, and an upper plate seals the second chamber, wherein the upper plate includes a sealing trace formed at the area corresponded to the area where the second chamber sealed.

16 Claims, 6 Drawing Sheets

POUCH TYPE LITHIUM RECHARGEABLE BATTERY

CLAIM OF PRIORITY

This application makes reference to, incorporates the same herein, and claims all benefits accruing under 35 U.S.C. §119 from an application for POUCH TYPE LITHIUM RECHARGEABLE BATTERY earlier filed in the Korean Intellectual Property Office on 29 Dec. 2005 and there duly assigned Ser. No. 10-2005-0134548.

BACKGROUND OF THE INVENTION

1. Field of the Invention

The present invention relates to a pouch type lithium secondary battery, and more particularly, to a pouch type lithium secondary battery that is capable of improving saturation of an electrolyte by forming a containing space that contains an electrode assembly at one side of a multilayer-film pouch that forms a lower plate of a case, forming a gas chamber at the other side of a multilayer-film pouch that forms an upper plate of the case, and being formed for the gas chamber to connected with the containing space of the electrode assembly when a multilayer film pouch film is folded.

2. Description of the Related Art

A lithium ion battery is widely used for lightweight electronic appliances such as a mobile phone or a camcorder. Further, it is nature-friendly because it does not use heavy metals such as mercury (Hg) or cadmium (Cd). The lithium ion battery has a large output and capacity compared with conventional batteries.

The lithium ion secondary battery is divided into a lithium metal secondary battery that uses a lithium metal as a negative active material and a lithium ion secondary battery that uses carbon substance as a negative active material. Since the lithium ion secondary battery doesn't use a lithium metal that has a high reactivity, it is more stable as compared to a lithium metal secondary battery. The lithium secondary battery is divided into prismatic-type, cylindrical-type, and pouch type. The prismatic-type lithium ion secondary battery whose bare cell is fabricated by inserting an electrode assembly which is wound in a jelly-roll type to a rectangular-pole-shaped can, sealing the can with a cap assembly and injecting an electrolyte through an electrolyte inlet in the can. The cylinder type lithium secondary battery whose bare cell is fabricated by inserting an electrode assembly which is wound in a jelly-roll type to a cylinder type can, sealing the can with a cap assembly and injecting an electrolyte through an electrolyte inlet in the can. The pouch type lithium secondary battery whose bare cell is fabricated by inserting an electrode assembly which is wound in a jelly-roll type to the multilayer-film pouch formed by coating polymer at the inside of metal foil, sealing the multilayer-film pouch and injecting an electrolyte through a gas chamber.

Further, the lithium secondary battery is divided into a lithium secondary battery that uses a liquid electrolyte depending on the type of the electrolyte, and a lithium polymer battery that uses the solid polymer as an electrolyte. The lithium polymer battery classifies into a solid type that does not include an organic electrolyte, and a gel type that includes an organic electrolyte.

SUMMARY OF THE INVENTION

Accordingly, the present invention is devised to solve the above-mentioned problems occurring in the prior art, and an object of the present invention is to provide a pouch type lithium secondary battery that is capable of improving saturation of an electrolyte by forming a containing space that contains an electrode assembly at one side of a multilayer-film pouch that forms a lower plate of a case, forming a gas chamber at the other side of a multilayer-film pouch that forms an upper plate, and being formed for the gas chamber to connected with the containing space of the electrode assembly when a multilayer film pouch film is folded.

In order to accomplish the object of the present invention, there is provided a pouch type lithium secondary battery including an electrode assembly having a positive electrode plate and a negative electrode plate, which are facing against each other, and a separator that is interposed between the positive electrode plate and the negative electrode plate; and a case that includes a lower plate in which a second chamber containing the electrode assembly is included, and an upper plate which seals the second chamber. Here, the upper plate includes a sealing trace formed at the area corresponded to the area where the second chamber is sealed. The sealing trace is formed in a shape where unshaped creases are distributed. Further, the upper plate includes a trace of a common portion connected with the sealing trace in the area corresponded to the inner area of the second chamber. Further, the trace of the common portion trace is formed in a shape where unshaped creases are distributed, and the plane shape is formed in one shape among a semicircle, a triangle, and a trapezoid.

Further, the case is formed by folding a multilayer film pouch so as to form a common portion formed by contacting the second chamber and a first chamber each other, the second chamber is formed at one upper side of the multilayer film pouch and the first chamber is formed in a diagonal direction to the second chamber. the second chamber is formed at one upper side of the case, and a multilayer-film pouch where the first chamber is formed in a diagonal direction with the second chamber are folded to form a common portion where the second chamber and the first chamber touch each other. Here, the first chamber is formed so that its the thickness is reduced as the first chamber goes in the second chamber direction.

Further, the first chamber is formed by including the first side formed slant from the second chamber direction of the lower plate so that the inner height of the first chamber to the upper plate gradually increases, and the second side formed so that the inner height of the first chamber from the first side to the upper plate rapidly decreases, in a vertical section. the first chamber is formed by including the first side formed inclination from the second chamber direction of the lower plate so that the inner height to the upper plate gradually increases, and the second side formed so that the inner height from the first side to the upper plate rapidly decreases, in a vertical section. Here, the vertical section shape of the first chamber is a triangle shape. the shape of the vertical section is a triangle shape. The lower plate makes an acute angle with the first side, the lower plate makes an acute angle with the second side, and the first side makes an obtuse angle with the second side in the triangle. The first side is formed in parallel with the lower plateside, and is formed in an easy curved shape in an area corresponded to the second chamber.

Further, the sealing trace is formed as one set in the central part from the side of the second chamber.

In order to accomplish the object of the present invention, there is provided a fabricating method of a pouch type lithium secondary battery, the method including forming a first chamber at one side of a multilayer film pouch and a second chamber at the other side of the multilayer film pouch in a diagonal direction to the first chamber and folding the multilayer film pouch having an upper plate in which the first chamber is formed and a lower plate in which the second chamber is formed so as to form a common portion by overlapping a portion of the first chamber and a portion of the second chamber; folding a multilayer pouch, in such a manner that a first chamber is formed at one side of the multilayer pouch, a second chamber is formed at the other side of the first chamber in a diagonal direction, and a common portion where a portion of the first chamber and a portion of the second are overlapped is formed; sealing the second chamber containing the electrode assembly to the upper plate by forming a gangway connecting the first chamber and the outside, and by heating and pressuring the area where the first chamber and the second chamber are excluded; injecting an electrolyte to the first chamber via the opened gangway; charging and discharging the electrode assembly; and sealing the area where the first chamber is formed near the second chamber, and removing the area that includes the first chamber area which has not been sealed. Here, the method can include sealing the gangway after injecting the electrolyte to the first chamber via the opened gangway. Here, the area where the first chamber is formed on the upper plate is formed as a sealing trace, and the sealing trace is formed in an unshaped creases shape. As the common portion is transformed into a plane in the step where the upper plate and the lower plate are sealed, a trace of the common portion is formed. The trace of the common portion trace is formed in an unshaped creases shape.

In order to accomplish the object of the present invention, there is provided a pouch type lithium secondary battery that is formed according to the aforementioned fabricating method of a pouch type lithium secondary battery.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 2b is a perspective view illustrating a back side of the pouch type lithium secondary battery illustrated in FIG. 2a;

FIG. 3b is a perspective view illustrating a front side of the pouch type lithium secondary battery illustrated in FIG. 3a after being folded along the line X-Y of FIG. 3a;

DETAILED DESCRIPTION OF THE INVENTION

Hereinafter, preferred embodiments of the present invention will be described in detail with reference to the accompanying drawings so that those skilled in the art can easily perceive the present invention.

Figure 1A:
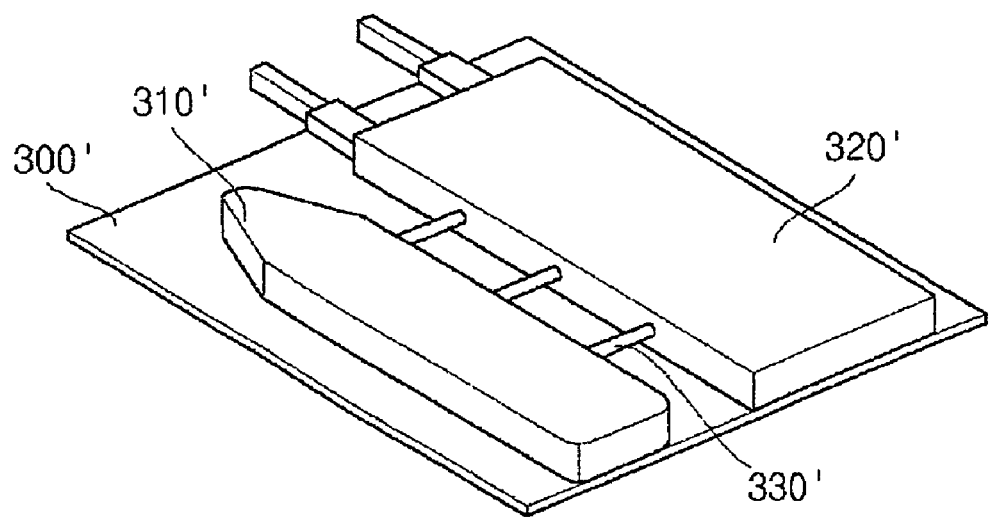
FIGS. 1a and 1b are perspective views illustrating a general example of a pouch type lithium secondary battery.
Figure 1B:
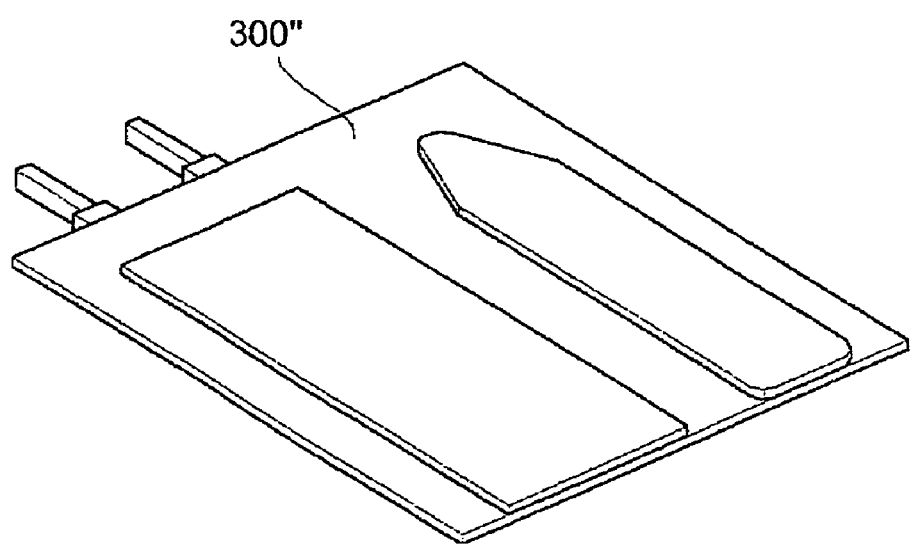

FIGS. 1a and 1b illustrate a general example of a pouch type lithium secondary battery. FIG. 1a illustrates a front side of the pouch type lithium secondary battery in the state where a gas chamber has not been removed, and FIG. 1b illustrates a back side of the pouch type lithium secondary battery.

In general, a pouch type lithium secondary battery whose bare cell is fabricated by forming a first chamber 310' (in general, called a "gas chamber") to one side of a multi-layer film pouch 300', a second chamber 320', which is a space where a electrode assembly is inserted, to another side of the multi-layer film pouch 300', and an electrolyte-injection path 330'.

The bare cell is further fabricated by inserting the electrode assembly to the second chamber 320', folding one side of the multi-layer film pouch toward the upper surface 300" of the other side of the multi-layer film pouch and sealing the three open sides of the multi-layer film pouch 300' in a high-temperature and a high-pressure; and by removing any air in the first chamber 310'.

An electrolyte is injected to the electrode assembly and should be supplied via the first chamber 310' connected to a path which is connected to the outside (exterior). The supplied electrolyte should be injected to the second chamber 320 via electrolyte-injection path 330'. Further, the first chamber 310' collects a gas generated in the process of preliminary charging or discharging so that the first chamber 310' is the only portion that is expanded.

Likewise, in such an example of a pouch type lithium secondary battery, since the first chamber and the second chamber are formed at the same side of the pouch (300'), the electrolyte-injection path 330' is additionally formed, and thus, as the thickness of the cell increases, the injection of the electrolyte may become difficult, and the outward appearance may not look neat.

Figure 2A:
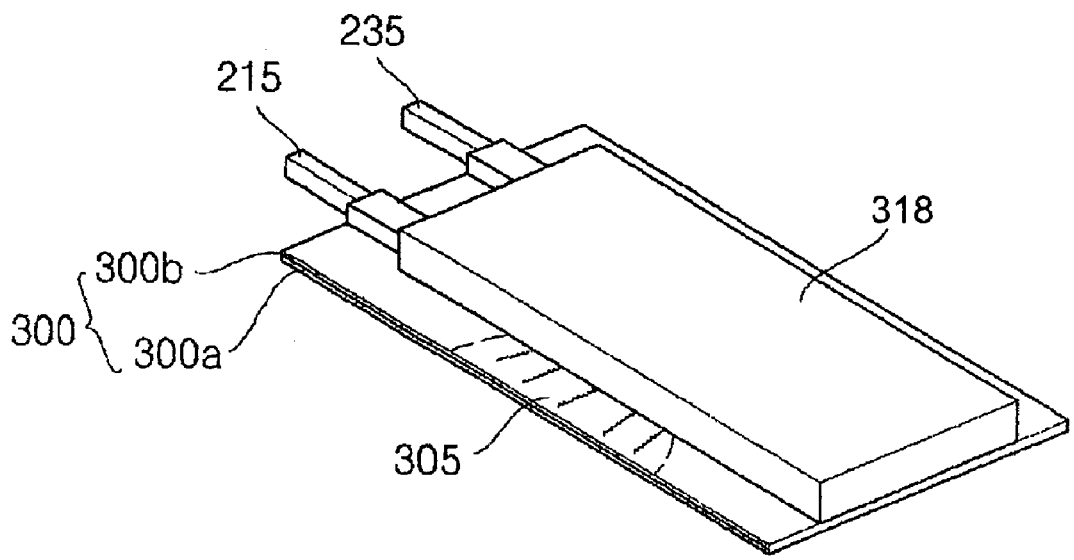
FIG. 2a is a perspective view illustrating a front side of a pouch type lithium secondary battery according to an embodiment of the present invention.
Figure 2B:
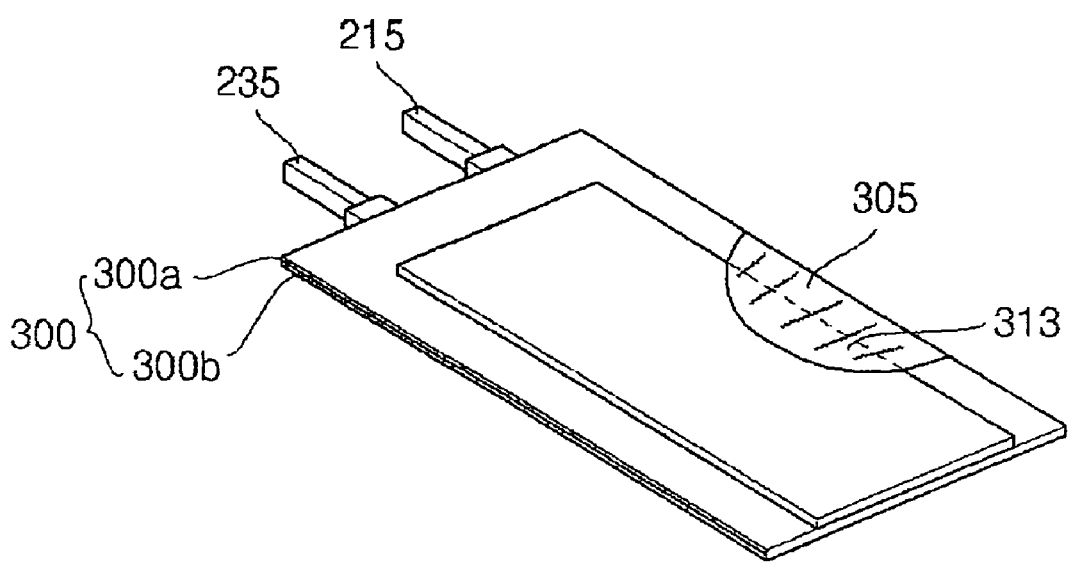

FIG. 2a illustrates a front side of a pouch type lithium secondary battery according to an embodiment of the present invention. FIG. 2b illustrates a back side of the pouch type lithium secondary battery of FIG. 2a.

A pouch type lithium secondary battery according to an embodiment of the present invention is formed by including an electrode assembly 200, a case 300, and a sealing trace 305 formed at the case 300. The pouch type lithium secondary battery can include a trace of a common portion 313. Further, the pouch type lithium secondary battery can be formed by further including a protection circuit module(not shown) which is electrically connected to electrode assembly 200 to control the charging and discharging processes of the electrode assembly 200.

The electrode assembly 200 includes a positive electrode plate (not shown) and a negative electrode plate (not shown), which are facing against each other, and a separator (not shown) that is interposed between the positive electrode plate and the negative electrode plate. The electrode assembly 200 can be formed in a rectangular or square shape, but not limited to them. The electrode assembly 200 includes a positive electrode tab 215 and a negative electrode tab 235.

The positive electrode plate includes a positive electrode collector (not shown), and a positive electrode active material layer (not shown) formed on the positive electrode collector. A positive electrode non-coating portion (not shown) where the positive electrode active material layer is not formed is formed at the end of the positive electrode collector. The positive electrode tab 215 is electrically connected to the positive electrode non-coating portion to make electrons collected in the positive electrode collector flow to the outside circuit. The positive electrode collector is formed by aluminum (Al) or other materials having good conductivity, and the positive electrode tab is formed by aluminum or other materials. The positive electrode tab 215 is welded by ultrasonic welding in the positive electrode non-coating portion. The positive electrode active material layer is formed by combining conductive materials and binders with lithium metal oxides such as lithium cobalt oxide (LiCoO2) in such a manner that the lithium ion can be absorbed or separated. Further, after the positive electrode tab is welded in the positive electrode non-coating portion, a tape is attached in order to prevent separation of the positive electrode tab.

The negative electrode plate includes a negative electrode collector (not shown) that collects electrons generated by chemical reactions, and a negative electrode active material layer (not shown) formed on the upper side of the negative electrode collector. A negative electrode non-coating portion (not shown) where the negative electrode active material layer is not formed is formed at the end of the negative electrode collector. The negative electrode tab 235 is formed at the negative electrode non-coating portion, and makes electrons collected in the negative electrode collector flow to the outside. A tape is attached on the negative electrode tab 235 in such a manner the negative electrode tab 235 is not separated from the negative electrode non-coating portion. The negative electrode collector is formed by copper (Cu) or Nickel (Ni) having good conductivity, and the negative electrode tab is generally formed by Nickel (Ni). The negative electrode non-active material layer is formed by combining carbon materials with conductive materials and binders in such a manner that the lithium ions can be absorbed and separated.

The separator is interposed between a positive electrode plate and a negative electrode plate, and prevents a short circuit that can occur between the positive electrode plate and the negative electrode plate. The separator is made of thermoplastic resin, for example polyethylene (PE) or polypropylene (PP), among others, and the surface is in porous film structure. As the temperature of the inside of the battery rises to the point near the melting point of the thermoplastic resin, the separator is melted, and the holes are blocked, whereby such a porous film structure becomes an insulation film. Such a phenomenon is called a shut down phenomenon sealing of a separator or a shut down phenomenon. As such, by being changed into the insulation film, the movement of lithium ions between the positive electrode plate and the negative electrode plate is blocked, and no more current flows, thereby stopping the temperature rise of the inside of the battery.

Referring to FIGS. 2a and 2b, the case 300 includes an upper plate 300a and a lower plate 300b consisting of a multi-layer film pouch consisting of a metal foil and one or more polymer films, which covers the metal foil. A lower plate 300b of the case 300 is formed by including a chamber 318 containing the electrode assembly 200, and an upper plate 300a of the case 300 is formed by sealing an upper part of the chamber 318. A chamber 318 where the electrode assembly 200 is contained is formed at the lower plate 300b, and the upper plate 300a seals the upper side of the chamber 318. Therefore, the upper plate 300a contains the electrode assembly 200 therein within the case 300, and the inner space of the case 300 is sealed up by attaching the upper plate 300a and the lower plate 300b, which seals the inner space as the upper plate 300a and the lower plate 300b are joined. Since the case 300 is formed by a multi-layer film pouch of a metal foil, the weight of the secondary battery can be significantly reduced as compared with a secondary battery applying a metal can as a case. The metal foil of the multi-layer film pouch is generally formed by an aluminum (Al) material. The polymer film that forms an inner layer of the multi-layer film pouch protects the metal foil from the electrolyte, and prevents a short circuit between the positive electrode, the negative electrode, and electrode tabs 215 and 235.

Figure 3A:
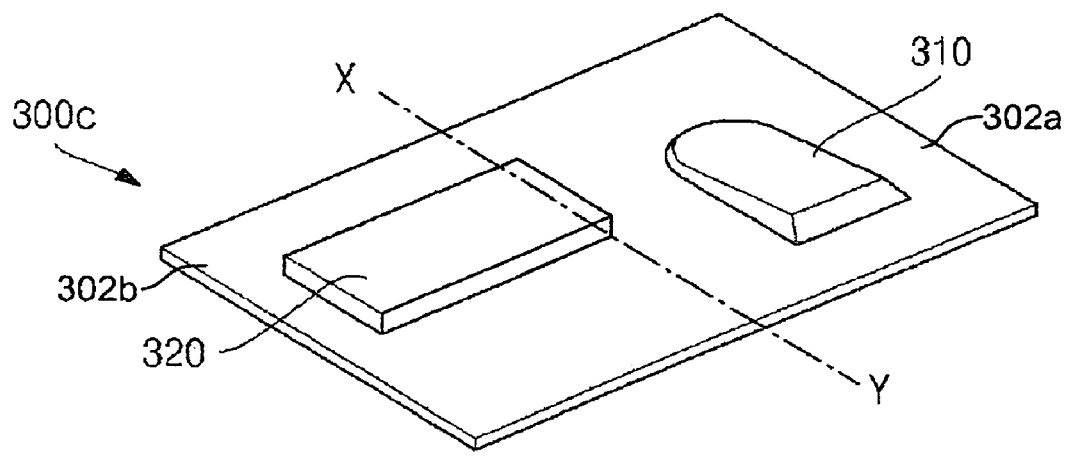
FIG. 3a is a perspective view illustrating a multi-layer film pouch before being folded in order to form a case that is used in a second embodiment of a pouch type lithium secondary battery of the present invention.
Figure 3B:
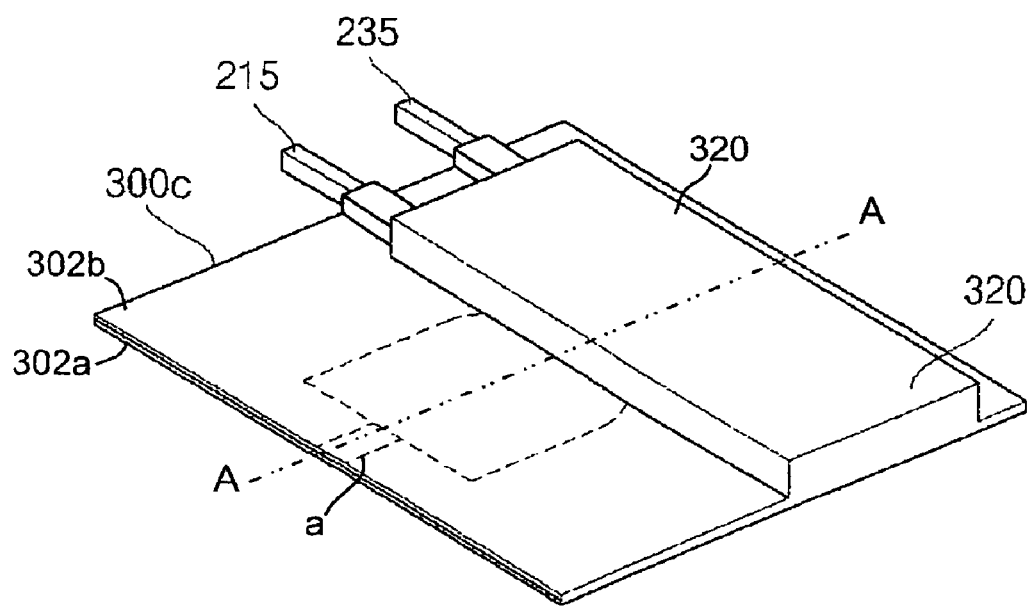

FIG. 3a is a perspective view illustrating a multi-layer film pouch before being folded in order to form a case that is used in a second embodiment of a pouch type lithium secondary battery of the present invention; FIG. 3b is a perspective view illustrating a front side of the pouch type lithium secondary battery illustrated in FIG. 3a after being folded along the line X-Y of FIG. 3a; and FIG. 3c is a perspective view illustrating a back side of the pouch type lithium secondary battery illustrated in FIG. 3b.

Figure 3C:
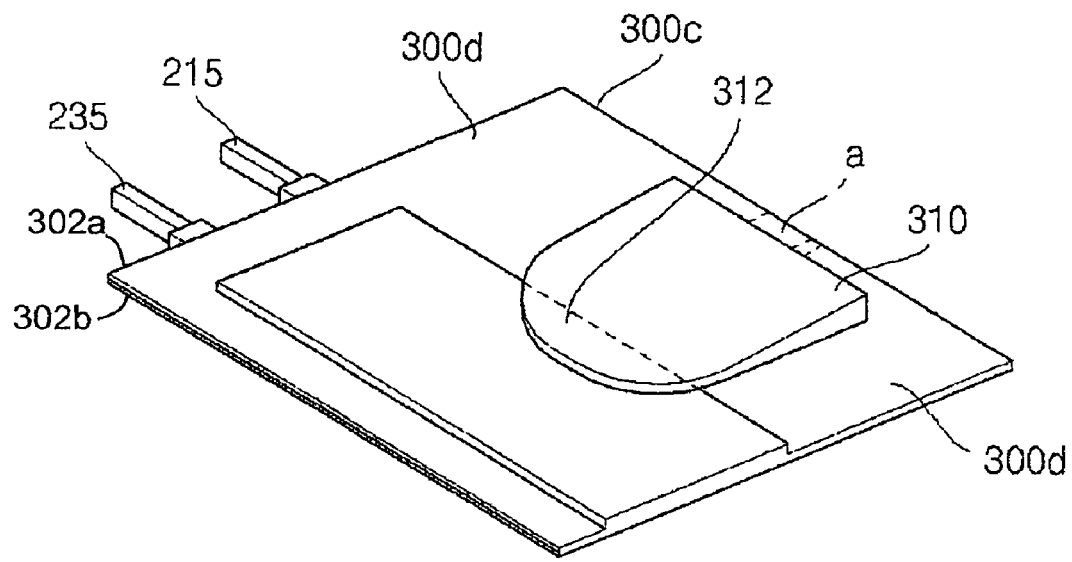
FIG. 3c is a perspective view illustrating a back side of the pouch type lithium secondary battery illustrated in FIG. 3b.

Referring to FIGS. 3a to 3c, the case, formed as the multi-layer film pouch 300c, is folded along center folding line X-Y resulting in the pouch type lithium secondary battery illustrated in FIGS. 3b and 3c.

In FIG. 3a, a first chamber 310 is formed at one side of folding line X-Y, and a second chamber 320 is formed on the other side of folding line X-Y. The one side where the first chamber 310 is formed becomes the upper plate 302a of the multi-layer film pouch 300c, and the other side where the second chamber 320 is formed becomes the lower plate 302b of the multi-layer film pouch 300c. Here, the first chamber 310 plays roles as a path where the electrolyte is injected, and as a space that contains gas generated when pre-charged and pre-discharged. The first chamber 310 is generally called a gas chamber. Further, the second chamber 320 plays a role as a space where the electrode assembly 200 is contained.

The first chamber 310 and the second chamber 320 are in a multi-layer film pouch 300c so that when the multi-layer film pouch 300c is folded based on X-Y line, a common portion 312 (illustrated in a dotted line in FIG. 3c) is formed. The common portion 312 refers to a certain area where the first chamber 310 and the second chamber 320 are overlapped when the upper plate 300a and the lower plate 300b are folded. The common portion 312 is formed as an area having a height indicated as "h" in FIGS. 3d and 4.

The first chamber 310 and the second chamber 320 are formed by the press process of the multi-layer film pouch 300c.

The first chamber 310 is formed to have a volume that can contain gas generated from the second chamber 320. The electrolyte is injected to the first chamber 310 via the gangway (a) from the outside, and the electrolyte that has been injected to the first chamber 310 is injected to the second chamber 320. Further, the first chamber 310 containscontains the gas generated in the preliminary charging and discharging processes of the electrode assembly that is performed in the state where the gangway (a) is sealed. Further yet, a marginal part 300d, a sealed area, is formed at both sides of the first chamber 310. Since there comes be the marginal part 300d at both sides of the first chamber 310, the width of the first chamber 310 becomes relatively small, and thus after the charging and discharging are completed, the areas that include the first chamber 310 are removed, and when sealed, the sealing area is reduced. Therefore, the sealing work can be easily done.

Figure 3D:
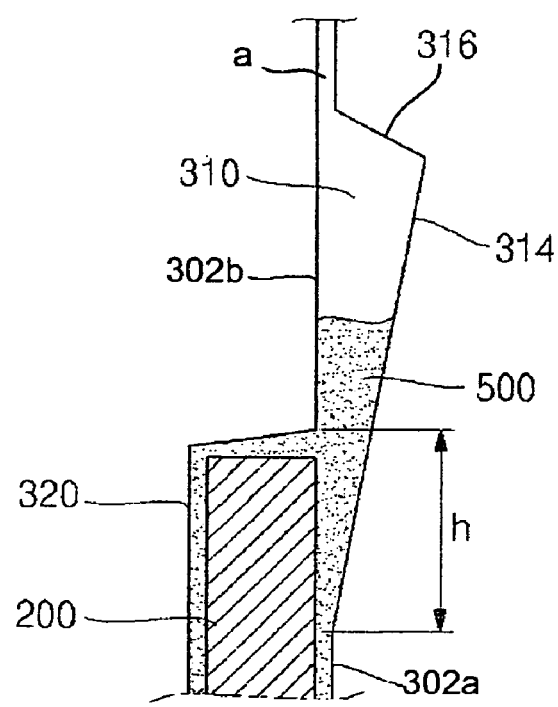
FIG. 3d is a sectional view illustrating a part taken along the line A-A of FIG. 3b.

FIG. 3d is a sectional view illustrating a part taken along the line A-A of FIG. 3b.

Referring to FIG. 3d, the thickness of the first chamber 310 decreases as it goes to the second chamber 320 direction so that the electrolyte 500 can be efficiently immersed into the electrode assembly 200, and at the same time the thickness of the first chamber 310 can be reduced as much as possible. Specifically, the first chamber 310 includes the first side 314 formed at an incline so that the inner height of the first chamber 310 gradually increases from the area where the second chamber 320 is formed (common portion 312 in FIG. 3c), and the second side 316 formed at a decline towards gangway (a) so that the inner height of the first chamber 310 rapidly decreases from the first side 314. The first side 314 is extended from the upper plate 302a of the area corresponded to the area where the second chamber 320 on the lower plate 302b is formed.

On the other hand, the first chamber 310 can be formed so that the sectional shape made by the first side 314, the second side 316, and the upper plate 302a becomes a triangle, but not limited to this. Therefore, in the triangle shape of the first chamber 310, the first side 314 can make an obtuse angle with the second side 316, and the upper plate 302a and the first side 314, and the upper plate 302a and the second side 316 can make an acute angle. In the first chamber 310, it is preferably desirable that the second side 316 is formed short in order to make the height low, and the first side 314 is formed long, in order to make the height of the first chamber 310 low. In other words, the angle made by the first side 314 and the upper plate 302a needs to be smaller than the angle made by the second side 316 and the upper plate 302a. Therefore, as the inner space of the first chamber 310 goes to the second chamber 320, the inner space of the first chamber 310 as the inner space goes to the second chamber 320 direction, the first chamber 310 gradually decreases, and the electrolyte being supplied is smoothly supplied to the second chamber 320.

Figure 4:
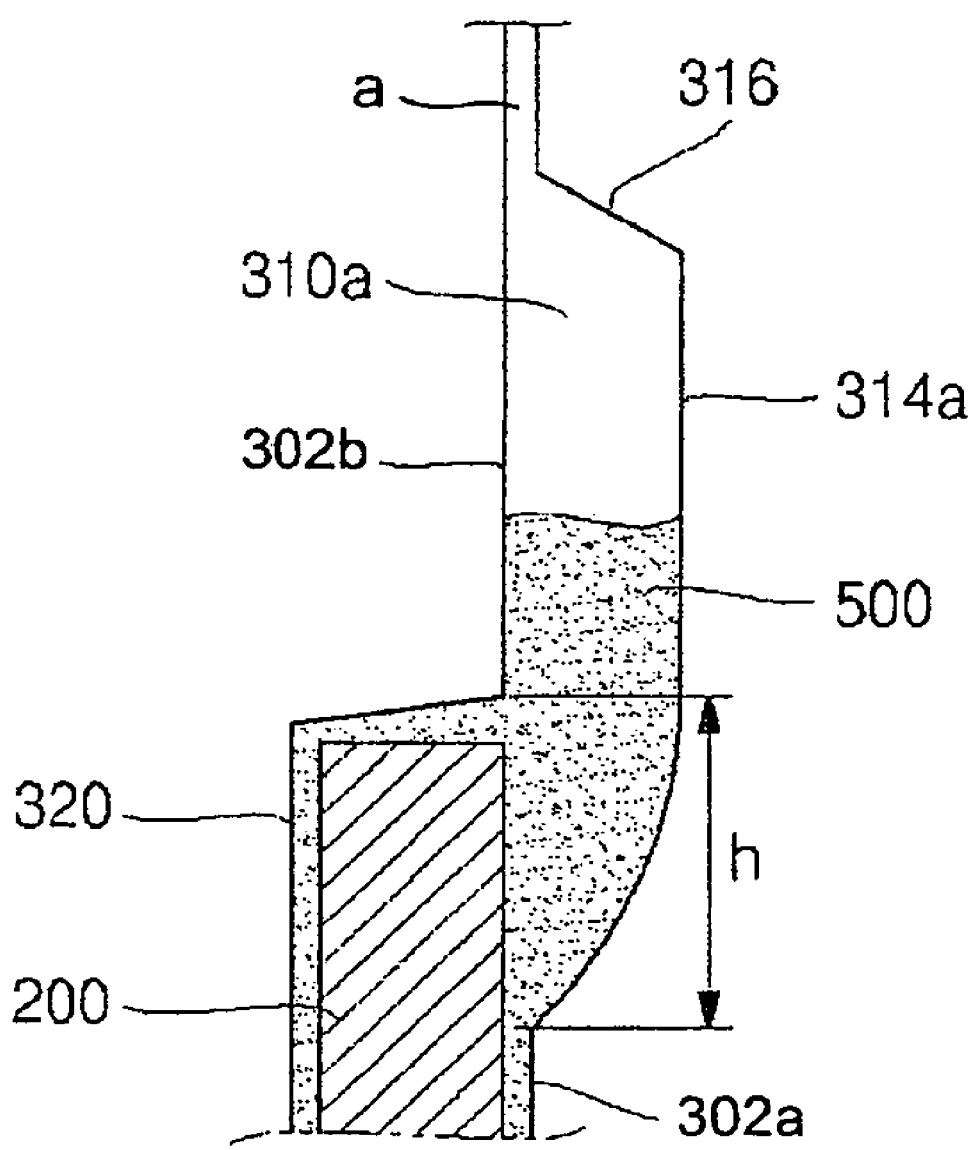
FIG. 4 is a sectional view of the pouch type lithium secondary battery taken along the line A-A of FIG. 3b according to a third embodiment of the present invention.

FIG. 4 is a sectional view of the pouch type lithium secondary battery taken along the line A-A of FIG. 3b according to a third embodiment of the present invention.

Referring to FIG. 4, a first side 314a of a first chamber 310a formed on the upper plate 302a is formed in a plane shape, and can be formed in an easy curved shape in the area corresponding to a common portion (312 in FIG. 3c) with the second chamber 320. Therefore, the electrolyte injected through the first chamber 310a flows down along an easy curve of the first side 314a, and is injected to the second chamber 320. At the first side 314a of the first chamber 310a, the amount of the electrolyte 500 contained in the first chamber 310a is increased compared with the linear-shaped first side 314 of the FIG. 3d, and thus the saturation of the electrolyte increased.

The second chamber 320 is formed to have the shape and the volume corresponded to the outer appearance of the contained electrode assembly 200.

Referring to FIGS. 3d and 4, the common portion 312 is formed as an area having a height indicated as "h" in FIGS. 3d and 4.

Further, the first chamber 310/310a does not necessarily include a separate shape to distinguish a common portion 312. However, at the first chamber 310/310a, a separate shape can be formed so that a position of a common portion 312 can be confirmed in the fabricating process. In this case, the common portion 312 can be distinguished by the shape on the first side 314.

The common portion 312 plays a role as a path to the electrolyte contained in the first chamber 310 into the inside of the electrode assembly 200 positioned within the second chamber 320. First, the first chamber 310 is provided the electrolyte from the outside via gangway (a) connected with the outside. The electrolyte 500 provided to the first chamber 310/310a is injected to the back side of the electrode assembly 200 via the common portion 312. Therefore, the pouch type lithium secondary battery does not need the separate injection path 330 illustrated in FIG. 1a, and thus the process becomes simple, and the efficiency of the electrolyte injection is improved.

It is preferably desirable that the common portion 312 is formed in an area corresponded to the central area from the side of the second chamber 320 based on the direction parallel to the draw direction of the positive electrode tab 215. Here, the electrolyte supplied to the second chamber 320 can be supplied evenly. Further, a marginal part 300d, a sealed area, is formed at both sides of the first chamber 310. Since there comes be the marginal part 300d at both sides of the first chamber 310, the width of the first chamber 310 becomes relatively small, and thus after the charging and discharging are completed, the areas that include the first chamber 310/310a are removed, and when sealed, the sealing area is reduced. Therefore, the sealing work can be easily one.

Figure 5A:
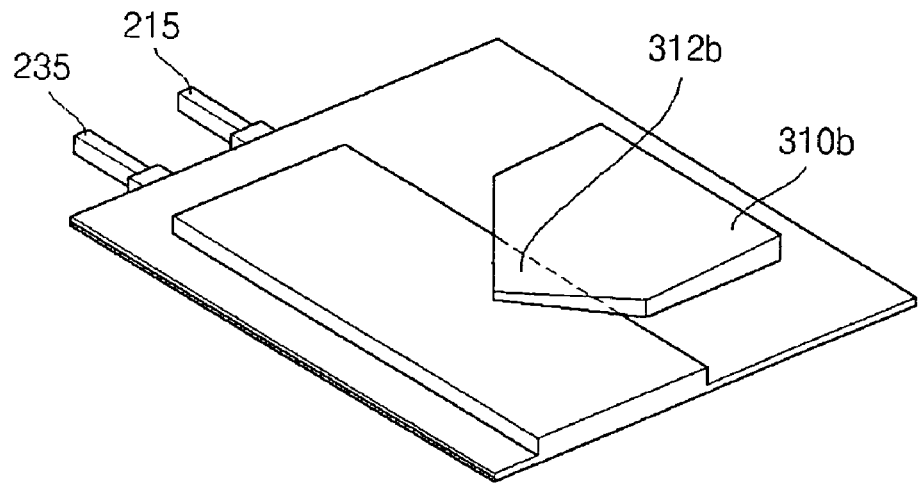
FIGS. 5a and 5b are perspective views illustrating of a back side of the pouch type lithium secondary battery that corresponds to FIG. 3c according to fourth and fifth embodiments of the present invention.
Figure 5B:
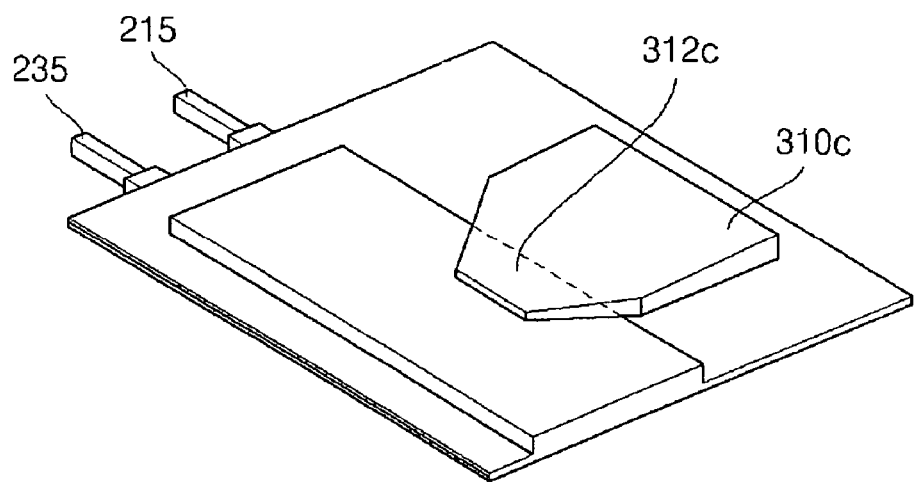

FIGS. 5a and 5b are perspective views illustrating of a back side of the pouch type lithium secondary battery that corresponds to FIG. 3c according to fourth and fifth embodiments of the present invention.

The plane shape of the first chamber 310a can be formed in a shape where the square shape and the semicircular shape are combined. However, this does not limit the plane shape of the first chamber, and as illustrated in FIG. 5a, the first chamber can be formed in a shape such as a combination 310b of a square shape and a triangle shape 321a, or as illustrated in FIG. 5b a combination of a square shape 310c and a trapezoid shape 312c.

Further, the sealing trace 305 of FIG. 2b can be formed in the area where the first chamber 310 is formed in the process of binding the upper plate 300a and the lower plate 300b of the multi-layer film pouch 300c. As the first chamber 310/310a is formed by pressing, the area of the first chamber 310/310a becomes extended compared with surrounding areas, and the area and the length is more increased than the area of the lower plate 300b. Therefore, the area where the first chamber 310 is formed remains as a sealing trace 305 such as creases. The sealing trace 305 is formed as one set, and can be formed in a shape where unshaped various creases are distributed. Here, the fact that the sealing trace 305 is formed as one set means that creases are formed in one area along the shape of the first chamber 310/310a in the area where the first chamber 310/310a has been formed, but it does not mean that there is only one crease. The sealing trace 305 indicates that the pouch type lithium secondary battery has been formed from a multi-layer film pouch where the first chamber 310/310a and the second chamber 320 has been formed on a diagonal.

Further, if an area where the first chamber 310/310a is formed is bound, the common portion 312 can be formed in a common portion trace 313 formed in a shape where unshaped creases such as a sealing trace are distributed. The common portion trace 313 is formed in the pouch type lithium secondary battery as the common portion 312 is transformed into a plane shape in the sealing process of the upper plate 300a and the lower plate 300b. The common portion trace 313 is formed in a shape corresponded to the shape of the common portion 312, and can be formed in a plane shape of the semicircular shape. Further, the common portion trace can be formed in a plane shape of a triangle or a trapezoid according to the shape of the common portion 312b and 312c, as illustrated in FIGS. 5a and 5b. Therefore, the common portion trace is formed in a shape where multiple creases are distributed in the area shaped in a semicircular, triangle, and trapezoid shape.

Next, referring to FIG. 3a to 3d, a fabricating method of a pouch type lithium secondary battery according to an embodiment of the present invention is described.

First, as illustrated in FIG. 3a, a first chamber 310 and a second chamber 320 are formed on the surface of a multi-layer film pouch 300c in a way such as a press processing.

Here, the first chamber 310 and the second chamber are formed in a multi-layer film pouch 300c so that the diagonal of the first chamber 310 and the diagonal of the second chamber 320 coincide in order to position the two chambers at the opposite side against each other when the multi-layer film pouch 300c is folded. Here, in FIG. 3a, dotted line X-Y is a line that is folded when forming the multi-layer film pouch 300c. As illustrated in FIG. 3a, after forming the first chamber 310 at the lower right side of the second chamber 320, when the multi-layer film pouch 300c is folded along the X-Y line, the first chamber 310 and the second chamber 320 are positioned at the opposite side with each other, and a common portion 312 where the first chamber 310 and the second chamber 320 are overlapped is formed. The width of the common portion 312 can be regulated according to the position of the lower side of the second chamber 320 and the upper side of the first chamber 310.

Then, as illustrated in FIGS. 3b and 3c, an electrode assembly 200 is inserted to the second chamber 320, and a surrounding area of the pouch is sealed by heat and pressure, exempting the area where the first chamber 310 is formed, and a gangway (a) that penetrates between the first chamber 310 and the outside. Then, the electrolyte is injected via the gangway (a) in the first chamber 310, and the gangway (a) is sealed by heat and pressure. When the electrolyte injectedserted to the first chamber 310 is immersed enough to the inside of the electrode assembly 200, the preliminary charging and discharging is performed. Here, the gas generated in the second chamber 320 containing the electrode assembly is flowed to the the first chamber 310, so that the first chamber 310 is filled with the gas. The electrode assembly is charged by the inflow of the gas generated in the second chamber 320 containing the electrode assembly. When the preliminary charging and discharging is completed, the area where the unsealed first chamber 310 around the second chamber 320 is formed is heated and pressurized to seal it, and a pouch of the area that includes the unsealed first chamber 310 around the second chamber 320 is removed to complete the bare cell process.

Although a preferred embodiment of the present invention has been described for illustrative purposes, those skilled in the art will appreciate that various modifications, additions and substitutions are possible, without departing from the scope and spirit of the invention as disclosed in the accompanying claims.

According to the present invention, since a pouch type lithium secondary battery does not form an electrolyte injection path, the process becomes simple.

According to the present invention, since a first chamber is formed on the back side of a cell instead of an electrolyte injection path, the injection hole becomes wide, compared with the electrolyte injection path, and thus the saturation of the electrolyte is improved.

What is claimed is:

1. A pouch type lithium secondary battery having an electrode assembly that includes a positive electrode plate and a negative electrode plate facing against each other, and a separator interposed between the positive electrode plate and the negative electrode plate, the pouch type lithium secondary battery comprising:
   a case that includes an upper plate and a lower plate;
   wherein the lower plate includes a first chamber containing the electrode assembly;
   wherein the case is formed by folding a multilayer film pouch so as to form a common portion formed by contacting the first chamber and a second chamber with each other, the second chamber is formed at one upper side of the multilayer film pouch and the first chamber is formed in a diagonal direction to the second chamber at one lower side of the multilayer film pouch, the multilayer-film pouch being folded to form the common portion where the first chamber and the second chamber overlap each other;
   wherein the upper plate seals the first chamber formed at the lower plate, and includes a sealing trace formed at the area where the first chamber is sealed; and
   wherein the sealing trace is formed in a shape where unshaped creases are distributed.

2. The pouch-type lithium secondary battery as claimed in claim 1, wherein the upper plate includes a trace of a common portion trace connected to the sealing trace in the area corresponding to an inner area of the first chamber.

3. The pouch-type lithium secondary battery as claimed in claim 2, wherein the common portion trace of the common portion is formed in a shape where unshaped creases are distributed, and the plane shape of common portion trace is formed in one shape among a semicircle, a triangle, and a trapezoid.

4. The pouch-type lithium secondary battery as claimed in claim 1, wherein the second chamber is formed so that its inner height is reduced as the second chamber extends in the first chamber direction.

5. The pouch-type lithium secondary battery as claimed in claim 1, wherein the second chamber includes a first side formed inclined from the common portion so that an inner height of the second chamber gradually increases, and includes a second side formed so that the inner height of the second chamber rapidly decreases.

6. The pouch-type lithium secondary battery as claimed in claim 5, wherein the second chamber has a triangle shape.

7. The pouch-type lithium secondary battery as claimed in claim 6, wherein the first side makes an obtuse angle with the second side.

8. The pouch-type lithium secondary battery as claimed in claim 1, wherein the second chamber includes a first side formed in parallel with the lower plate, a second side extending in an acute angle from one end of the first side and third side formed in an easy curved shape from a second end of the first side in an area corresponding to the common portion.

9. The pouch-type lithium secondary battery as claimed in claim 1, wherein the sealing trace is formed as one set in a central part from the side of the first chamber.

10. A manufacturing method of a pouch-type lithium secondary battery, the method comprising:
   forming a first chamber at one side of a multilayer film pouch and a second chamber at the other side of the multilayer film pouch in a diagonal direction to the first chamber and folding the multilayer film pouch such that an upper plate is formed on which the first chamber is disposed and a lower plate is formed on which the second chamber is disposed so as to form a common portion by overlapping a portion of the first chamber and a portion of the second chamber;
   sealing the lower plate having said second chamber, said second chamber containing an electrode assembly, to the upper plate while forming an opened gangway connecting the first chamber to the outside, said sealing being formed by heating and pressuring the area where the first chamber, the second chamber and gangway are excluded;
   injecting an electrolyte to the first chamber via the opened gangway;
   charging and discharging the electrode assembly; and sealing the area where the first chamber is formed near the second chamber, and removing the area that includes the first chamber area which has not been sealed.

11. The manufacturing method as claimed in claim 10, further comprising sealing the gangway after injecting the electrolyte to the first chamber via the opened gangway.

12. The manufacturing method as claimed in claim 10, wherein the area where the first chamber is formed on the upper plate is sealed and formed as a sealing trace.

13. The manufacturing method as claimed in claim 12, wherein the sealing trace is formed in an unshaped creases shape.

14. The manufacturing method as claimed in claim 10, wherein as the common portion is transformed into a plane in the step where the upper plate and the lower plate are sealed, and is formed as a trace of the common portion.

15. The manufacturing method as claimed in claim 12, wherein the trace of the common portion trace is formed in an unshaped creases shape.

16. A pouch-type lithium secondary battery that is formed according to the manufacturing method of claim 10.

* * * * *